(12) United States Patent
Gaskins

(10) Patent No.: US 7,502,880 B2
(45) Date of Patent: Mar. 10, 2009

(54) APPARATUS AND METHOD FOR QUAD-PUMPED ADDRESS BUS

(75) Inventor: Darius D. Gaskins, Austin, TX (US)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 11/369,896

(22) Filed: Mar. 7, 2006

(65) Prior Publication Data

US 2007/0011378 A1    Jan. 11, 2007

Related U.S. Application Data

(60) Provisional application No. 60/698,150, filed on Jul. 11, 2005.

(51) Int. Cl.
*G06F 13/36*    (2006.01)
*G06F 9/26*    (2006.01)

(52) U.S. Cl. .................................. 710/104; 711/211
(58) Field of Classification Search ............... 710/114, 710/104; 711/211
See application file for complete search history.

(56) References Cited

U.S. PATENT DOCUMENTS

| | | | |
|---|---|---|---|
| 4,796,232 A * | 1/1989 | House ................... | 365/189.03 |
| 5,255,378 A | 10/1993 | Crawford et al. | |
| 5,537,624 A | 7/1996 | Whitesell | |
| 5,561,780 A | 10/1996 | Glew et al. | |
| 5,640,517 A | 6/1997 | Parks et al. | |
| 5,644,788 A | 7/1997 | Courtright et al. | |
| 5,835,741 A | 11/1998 | Elkhoury et al. | |
| 5,901,298 A * | 5/1999 | Cummins et al. ........... | 710/313 |
| 5,915,126 A | 6/1999 | Maule et al. | |
| 5,919,254 A | 7/1999 | Pawlowski et al. | |
| 5,944,806 A * | 8/1999 | Melvin et al. ............... | 710/310 |

(Continued)

FOREIGN PATENT DOCUMENTS

EP    1242898    9/2002

(Continued)

OTHER PUBLICATIONS

Provisional, 60700691, Gaskin, Apparatus and Method for Sparce Line Write Transactions, Jul. 19, 2005.*

(Continued)

*Primary Examiner*—Khanh Dang
*Assistant Examiner*—Christopher A Daley
(74) *Attorney, Agent, or Firm*—Gary R. Stanford; Richard K. Huffman; James W. Huffman

(57) ABSTRACT

A microprocessor interface system including a system bus with a bus clock and a quad-pumped address signal group, and including multiple devices coupled to the system bus. Each device is configured to perform a quad-pumped transaction on the system bus in which multiple request packets are sequentially transferred via the address signal group during each of multiple phases of one cycle of the bus clock. The devices may include at least one microprocessor and one or more bus agents. In one embodiment, the first address data is multiplexed onto the address signal group during first and second request packets during a first phase of the bus clock cycle, and the second address data is multiplexed onto the address signal group during third and fourth request packets during a second phase of the bus clock cycle.

15 Claims, 4 Drawing Sheets

EXEMPLARY MICROPROCESSOR SIGNALS FOR QUAD-PUMPED REQUEST PHASE

U.S. PATENT DOCUMENTS

| | | | |
|---|---|---|---|
| 5,960,453 | A | 9/1999 | Pawlowski |
| 6,012,116 | A | 1/2000 | Aybay et al. |
| 6,032,225 | A | 2/2000 | Shiell et al. |
| 6,311,245 | B1 | 10/2001 | Klein |
| 6,356,270 | B2 | 3/2002 | Pentkovski et al. |
| 6,405,280 | B1 | 6/2002 | Ryan |
| 6,405,285 | B1 | 6/2002 | Arimilli et al. |
| 6,434,654 | B1 | 8/2002 | Story et al. |
| 6,505,259 | B1 | 1/2003 | Garcia et al. |
| 6,523,109 | B1 | 2/2003 | Meier |
| 6,587,862 | B1 | 7/2003 | Henderson |
| 6,601,121 | B2 | 7/2003 | Singh et al. |
| 6,609,171 | B1 * | 8/2003 | Singh et al. .......... 710/305 |
| 6,871,752 | B2 | 12/2003 | Rao et al. |
| 6,742,160 | B2 * | 5/2004 | Greiner ............. 714/801 |
| 6,804,735 | B2 * | 10/2004 | Singh et al. .......... 710/112 |
| 6,807,592 | B2 | 10/2004 | Singh et al. |
| 6,907,487 | B2 | 6/2005 | Singh et al. |
| 6,954,208 | B2 | 10/2005 | Doyle et al. |
| 7,130,952 | B2 | 10/2006 | Nanki et al. |
| 7,206,865 | B2 | 4/2007 | Creta et al. |
| 2002/0029307 | A1 | 3/2002 | Singh et al. |
| 2002/0103948 | A1 | 8/2002 | Owen et al. |
| 2003/0088799 | A1 | 5/2003 | Bodas |
| 2004/0199723 | A1 | 10/2004 | Shelor |
| 2005/0066114 | A1 | 3/2005 | Barth et al. |
| 2006/0053243 | A1 | 3/2006 | David et al. |
| 2006/0190677 | A1 | 8/2006 | Janzen |
| 2007/0011378 | A1 * | 1/2007 | Gaskins .............. 710/107 |

FOREIGN PATENT DOCUMENTS

EP          1416390          5/2004

OTHER PUBLICATIONS

Sakamoto et al. "Microarchitecture and performance analysis of a SPARC-V9 microprocessor for enterprise server systems." High-Performance Computer Architecture. 2003. HPCA-9 2003. Proceedings. Feb. 8-12, 2003. Abstract Only.

* cited by examiner

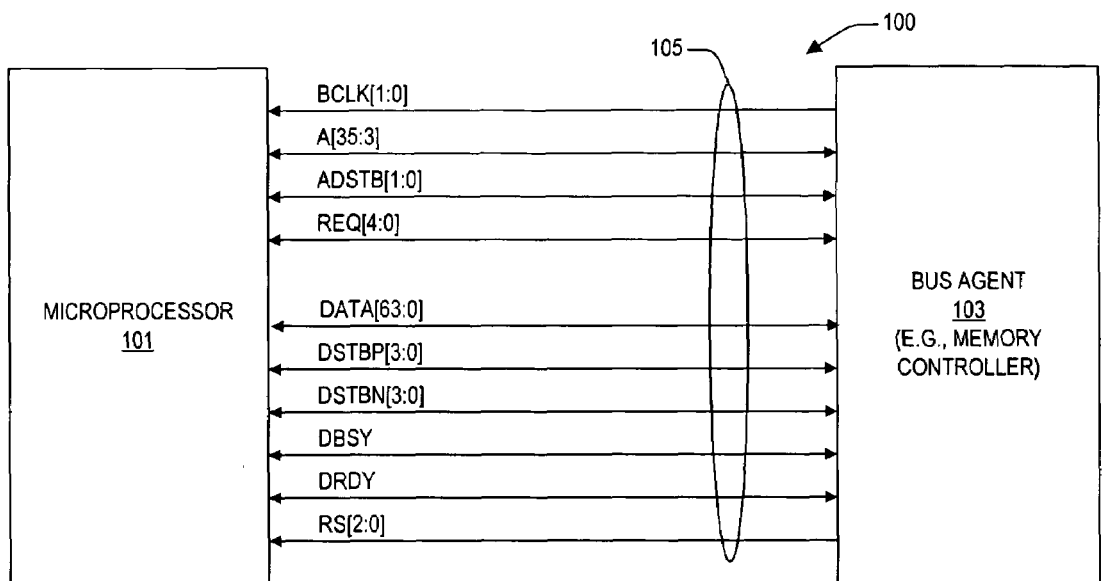
FIG. 1 (Prior Art)
FIG. 2 (Prior Art)
DOUBLE-PUMPED
REQUEST PHASE
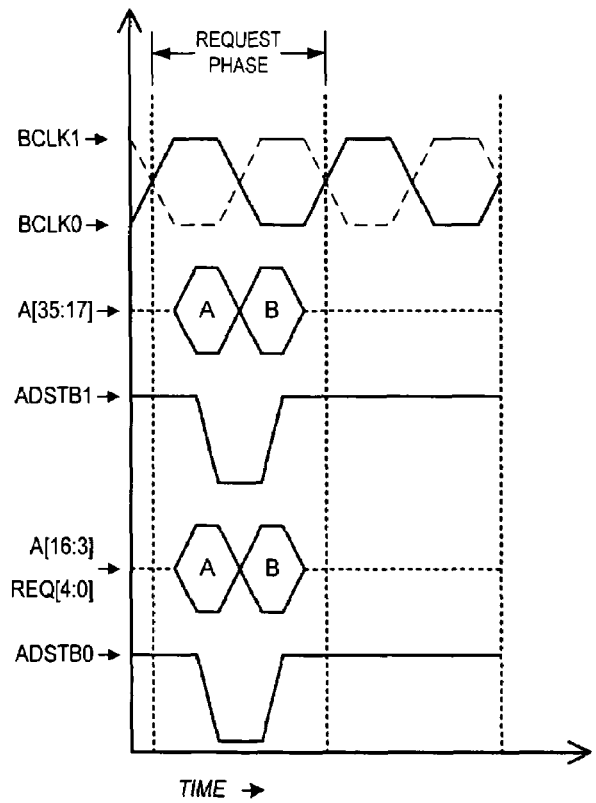

EXEMPLARY QUAD-PUMPED REQUEST PHASE SIGNAL DEFINITIONS
─400

| PHASE | PACKET | AHI[2:0], ALO[16:3] & RQ[2:0] | ADR[19:0] |
|---|---|---|---|
| A | A | AA[33:32, 30, 16:3], REQA[2:0] | AA[33:32, 30, 16:3], REQA[2:0] |
| A | B | AA[35:34, 31], APA, AA[29:17], –, REQA[4:3] | AA[35:34, 31], APA, AA[29:17], –, REQA[4:3] |
| B | C | AB[33:32, 30, 16:3], REQB[2:0] | AB[33:32, 30, 16:3], REQB[2:0] |
| B | D | AB[35:34, 31], APB, AB[29:17], –, REQB[4:3] | AB[35:34, 31], APB, AB[29:17], –, REQB[4:3] |

*EXEMPLARY SIGNAL MAPPING BETWEEN QUAD-PUMPED AND DOUBLE-PUMPED*

700

| QUAD-PUMPED MODE | DOUBLE-PUMPED MODE |
|---|---|
| RQ[2:0] (OR ADR[2:0]) | REQ[2:0] |
| UNUSED | REQ[4:3] |
| ALO[16:3] (OR ADR[16:3]) | A[16:3] |
| AHI[0] (OR ADR[17]) | A[30] |
| AHI[2:1] (OR ADR[19:18]) | A[18:17] |
| UNUSED | A[29:19] |
| UNUSED | A[34:31] |
| ADSTBP | ADSTB[0] |
| ADSTBN | A[35] |
| UNUSED | ADSTB[1] |

*FIG. 7*

APPARATUS AND METHOD FOR QUAD-PUMPED ADDRESS BUS

CROSS-REFERENCE TO RELATED APPLICATIONS

This application claims the benefit of U.S. Provisional Application Ser. No. 60/698150, filed on Jul. 11, 2005 which is herein incorporated by reference for all intents and purposes.

This application is related to the following co-pending U.S. Patent Applications, all of which have a common assignee and common inventors.

| SERIAL NUMBER | FILING DATE | TITLE |
|---|---|---|
| (CNTR.2268) | Feb. 28, 2006 | APPARATUS AND METHOD FOR SPARSE LINE WRITE TRANSACTIONS |
| (CNTR.2269) | — | MICROPROCESSOR APPARATUS AND METHOD FOR ENABLING VARIABLE WIDTH DATA TRANSFERS |
| (CNTR.2271) | — | FLEXIBLE WIDTH DATA PROTOCOL |
| (CNTR.2273) | — | APPARATUS AND METHOD FOR ORDERING TRANSACTION BEATS IN A DATA TRANSFER |

BACKGROUND OF THE INVENTION

1. Field of the Invention

The present invention relates to processor address buses, and more particularly to an apparatus and method for quad-pumped/double-pumped address bus which solves the problem of large package and unreasonable power requirements for a present day microprocessor where a significant amount of pins and power are devoted to the microprocessor's address bus interface.

2. Description of the Related Art

In a present day microprocessor, such as an x86-compatible microprocessor, transactions (i.e., read and write transactions) to/from memory are accomplished over a system bus. These transactions include a request phase where an address for a transaction along with the transaction type are provided over an address signal group. The address signal group typically includes an address bus, a set of corresponding address strobe signals, and a request bus. In one particular conventional configuration, the address signal group includes about 40 or so signals which must be provided on pins of a package for the microprocessor die. Many conventional configurations double-pumped multiple bus request packets (e.g., "A" and "B" request packets) on the address signal group during a single clock cycle. And further, many conventional microprocessor configurations support "quad-pumped" transactions in which an entire cache line (e.g., eight quadwords for a 64-byte cache line) is transferred across the bus in just a few clock cycles (e.g., two clock cycles). In the conventional double-pumped transactions, the signals of the address signal group are asserted twice during each clock cycle.

The present inventor has noted that this address signal group configuration is problematic in certain application areas where package size and/or power are constrained. Furthermore, every time one of these signals is driven to the bus, such as multiple assertions in a given clock cycle, additional power is consumed. It is therefore desirable to provide a mechanism whereby the number of address signal group pins and commensurate power requirements are reduced, but where the addressing functionality is retained. Furthermore, to accommodate varying application areas, it is desirable to provide a mechanism whereby an addressing capability can be configured in either a double-pumped mode as described above or in a new quad-pumped mode, as will be described herein.

SUMMARY OF THE INVENTION

A microprocessor according to an embodiment of the present invention includes a system clock pin receiving a bus clock signal, a first plurality of address pins and a first plurality of request pins, a second plurality of address pins, and address bus configuration logic. The address bus configuration logic includes an enable input which receives an enable signal, for operating the first plurality of address pins and the first plurality of request pins to perform a first transaction when the enable signal is asserted, and for operating the first and second plurality of address pins and the first and second plurality of request pins to perform a second transaction when the enable signal is not asserted, where the address bus configuration logic asserts a plurality of request packets onto the first plurality of address pins for each of a plurality of phases of a cycle of the bus clock signal. When the enable signal is asserted, the address bus configuration logic multiplexes first and second address data and first and second request data onto the first plurality of address pins and the first plurality of request pins during a first phase of the cycle of the bus clock signal and multiplexes third and fourth address data and third and fourth request data onto the first plurality of address pins and the first plurality of request pins during a second phase of the cycle of the bus clock signal.

In one embodiment, the address signal group pins include a first address strobe signal that is used to latch the first and third address and request data and a second address strobe signal that is used to latch the second and fourth address and request data. The first and second address data may collectively include an address of a transaction, the first and second request data may collectively include a type of the transaction, the third and fourth address data may collectively include an attribute of the transaction, and the third and fourth request data may collectively include a length of the transaction.

The microprocessor may be implemented with a reduced pin count including the address signal group pins that support a quad-pumped address transaction mode according to an embodiment of the present invention. Alternatively, a full set of address and request pins may be included for supporting the conventional double-pumped address transaction mode. If both modes are supported, the address bus configuration logic may include an enable input which receives an enable signal, where the address bus configuration logic operates address signal group pins to perform a quad-pumped transaction when the enable signal is asserted, and operates the full set of pins to perform a double-pumped transaction when the enable signal is not asserted.

A microprocessor interface system according to an embodiment of the present invention includes a system bus and a plurality of devices coupled to the system bus. The system bus has a first plurality of address signals, a first plurality of request signals, a second plurality of address signals, and a second plurality of request signals. One or more of the plurality of devices is configured to perform a quad-pumped transaction on the system bus in which a plurality of request packets are sequentially transferred during each of a plurality of phases of one cycle of the bus clock. Each of the one or more of the plurality of devices includes address bus configuration logic, comprising an enable input which receives an enable signal, for operating the first plurality of address signals and the first plurality of request signals to perform a first transaction when the enable signal is asserted, and for operating the first and second plurality of address signals and the first and second plurality of request signals to perform a second transaction when the enable signal is not asserted, where the address bus configuration logic asserts a plurality of request packets onto the first plurality of address signals for each of a plurality of phases of a cycle of the bus clock signal. The pumped transaction comprises first address and request data multiplexed as first and second request packets during a first phase of the one cycle of said bus clock and second address and request data multiplexed as third and fourth request packets during a second phase of the one cycle of said bus clock.

The address signal group may include a request bus, where the first request data is multiplexed onto the request bus during first and second request packets during a first phase of the bus clock cycle and where second request data is multiplexed onto the request bus during third and fourth request packets during a second phase of the bus clock cycle.

The quad-pumped transaction may include first and second request packets during a first phase and third and fourth request packets during a second phase of the bus clock cycle. The first and second request packets may collectively include a transaction address and a transaction type, and the third and fourth request packets may collectively include a transaction attribute and a transaction length. The quad-pumped transaction may include first address and request data multiplexed as first and second request packets during a first phase of the bus clock cycle, and second address and request data multiplexed as third and fourth request packets during a second phase of the bus clock cycle.

A method of performing a transaction on a system bus according to an embodiment of the present invention includes negotiating, by a plurality of devices coupled to the system bus, between operating the system bus in a double-pumped address mode or a quad-pumped address mode; and directing address bus configuration logic within one or more of the plurality of devices to operate in the quad-pumped address mode, and performing the transaction. The performing the transaction includes asserting a first request packet on the system bus during a first portion of a first phase of a cycle of a system bus clock, asserting a second request packet on the system bus during a second portion of the first phase of the cycle of the system bus clock, asserting a third request packet on the system bus during a first portion of a second phase of the cycle of the system bus clock, and asserting a fourth request packet on the system bus during a second portion of the second phase of the cycle of the system bus clock. The asserting a first request packet and said asserting a second request packet comprise multiplexing first address data onto the system bus and wherein the asserting a third request packet and said asserting a fourth request packet comprise multiplexing second address data onto the system bus.

The method may include asserting a first address strobe to latch the first and third request packets, and asserting a second address strobe to latch the second and fourth request packets. The method may include asserting an address of a transaction, asserting a type of the transaction, asserting an attribute of the transaction, and asserting a length of the transaction. The method may include multiplexing first address data onto the system bus and multiplexing second address data onto the system bus. The method may include negotiating, by multiple devices coupled to the system bus, between operating the system bus in a double-pumped address mode and a quad-pumped address mode.

BRIEF DESCRIPTION OF THE DRAWINGS

The benefits, features, and advantages of the present invention will become better understood with regard to the following description, and accompanying drawings where:

FIG. 1 is a simplified block diagram of a conventional microprocessor interface system;

FIG. 2 is a timing diagram showing the interaction of the signals within the address signal group described with reference to the conventional microprocessor interface system of FIG. 1 for performing request phases of a bus transaction;

FIG. 7 is a diagram of a table illustrating a signal congruency mapping between the double-pumped address mode and the quad-pumped address mode according to one embodiment of the present invention for a system device (microprocessor or bus agent) that supports both address modes.

DETAILED DESCRIPTION

Figures 3, 4:
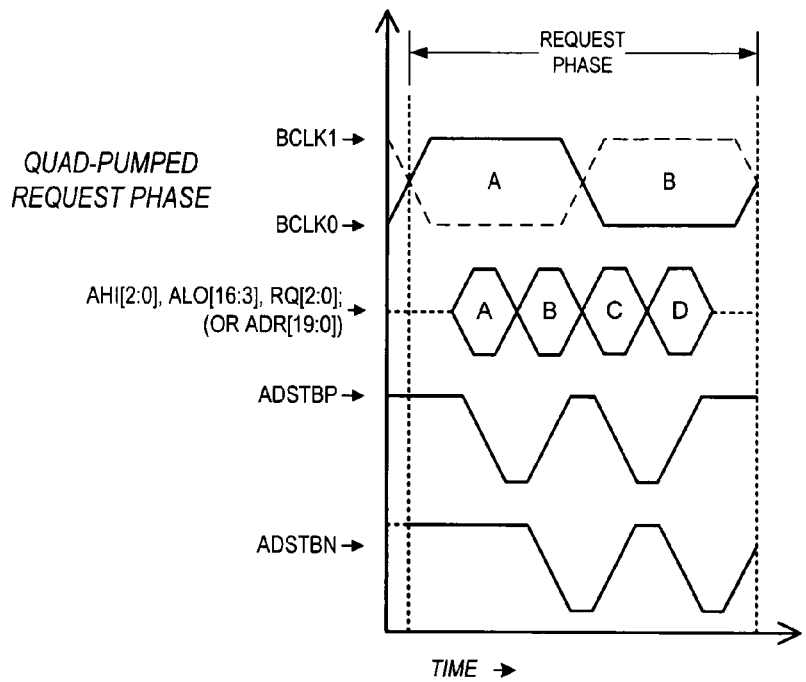
FIG. 3 is a timing diagram illustrating a request phase of a quad-pumped transaction according to an embodiment of the present invention.
FIG. 4 is a diagram of a table illustrating mapping of the data of each of the request packets A-D onto the quad-pumped address bus during request phases A and B of a double-pumped request transaction according to an exemplary embodiment of the present invention for an x86-compatible microprocessor.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present inventor has noted that this address signal group configuration is problematic in certain application areas where package size and/or power are constrained. He has therefore developed a selectable quad-pumped/double-pumped address bus which solves the problem of large package and unreasonable power requirements for a present day microprocessor where a significant amount of pins and power are devoted to the microprocessor's address bus interface, as will be further described below with respect to FIGS. 1-7.

FIG. 1 is a simplified block diagram of a conventional microprocessor interface system 100. The microprocessor interface system 100 includes a microprocessor 101 and a bus agent 103 interfaced with a system bus 105. The bus agent 103 represents any number of different types of bus agents as known to those skilled in the art, such as a memory controller, a host/PCI (Peripheral Component Interconnect) bridge, chipset, etc. The system bus 105 includes the signals for performing data transactions, including a bidirectional address bus A, a bidirectional data bus DATA, and multiple control signals. In the illustrated embodiment, the A bus has 33 signals shown as A[35:3] and the DATA bus has 64 signals shown as DATA[63:0], although it is understood that the address and data buses may have any suitable number of signals depending upon the particular configuration and architecture. One skilled in the art will appreciate that the least significant address signals are not required to allow for transfer of data with quadword granularity, which is the present state of the art.

The control signals include a differential clock bus BCLK [1:0], a bidirectional address strobe bus ADSTB[1:0] (indicating validity of the addresses on the A bus), a pair of data strobe buses DSTBP[3:0] and DSTBN[3:0], a bidirectional data bus busy signal DBSY (asserted by the entity that is providing data on the DATA bus), a data ready signal DRDY (asserted by either the device providing data during all clock cycles that data is transferred over the DATA bus), and a response bus RS which provides the type of transaction response (e.g., no data, normal data, implicit writeback) that is being completed over the DATA bus. In the illustrated embodiment, the RS bus has 3 signals shown as RS[2:0] and is asserted by the bus agent 103.

The signals shown for the conventional microprocessor interface system 100 are provided in virtually all present day microprocessors with minor variation. Some processors multiplex addresses and data over the same signal group and thus provide control signals to indicate whether data or addresses are present. Other microprocessors utilize different address or data bus widths or control signals alternatively named. Still further, addresses and/or data may be multiplexed over a smaller bus size than those illustrated by the conventional microprocessor interface system 100. What is important to note is that substantially all processors provide signals for communication with bus agents to indicate what type of transaction is requested, the parameters of that transaction, and to transmit/receive the data.

In a present day microprocessor, data can be transferred on a cache line basis (e.g., eight quadwords for a 64-byte cache line) according to a "quad-pumped" configuration. When transferring an entire cache line, two cycles of the bus clock signals BCLK[1:0] are used to transfer the eight associated quadwords in a cache line. Accordingly, four quadwords are transferred during each cycle of the bus clock BCLK[1:0]. During this type of data transfer, the signals of the data strobe buses DSTBP[3:0], DSTBN[3:0] are provided to indicate the validity of various quadword beats on the data bus so that 4 beats are transferred during a single bus clock. Likewise, bus request packets ("A" and "B") are double-pumped over the address signal group. Request packet A is transferred during a first half of a BCLK[1:0] cycle and request packet B is transferred during a second half of BCLK[1:0]. Source synchronous address strobe ADSTB[1:0] signals are provided to drive the request packet data out to the bus over the address signal group.

FIG. 2 is a timing diagram showing the interaction of the signals within the address signal group described with reference to the conventional microprocessor interface system 100 for performing request phases of a bus transaction. Operation of such transactions and corresponding signals as named herein in an x86-compatible microprocessor are described in numerous references, one of which is the book "The Unabridged Pentium® 4 IA32 Processor Genealogy, 1st Edition," by Tom Shanley. For clarity, assertion of the control signals is shown as a logic low level, although one skilled in the art will appreciate that assertion can as well be indicated by a logic high level. Cycles of the differential bus clock BCLK[1:0] are shown across the top of the timing diagram, in which BCLK[1] is shown using a dashed line and which toggles with opposite polarity as the BCLK[0] signal.

As noted above, request A and request B packets are double-pumped over the address signal group during a single cycle of BCLK[1:0]. The device that is initiating a transaction drives out packet A as well as asserting ADSTB[1:0] low at the point where packet A is valid. Thus ADSTB[1:0] is used by bus devices (e.g., the bus agent 103) to latch packet A. The initiator then drives out packet B and drives ADSTB[1:0] high at the point where packet B is valid, and packet B is latched on the rising edge of ADSTB[1:0]. ADSTB[0] is used to latch the request packet data carried on A[16:3] and REQ[4:0]. ASTB[1] is used to latch the request packet data carried on A[35:17]. Since packets A and B are provided over the same signal group during a single cycle of BCLK[1:0], this is known as a double-pumped address bus.

One skilled will appreciate that during the "A" request part of the cycle, the address signals A[35:3] contain the address of the transaction and REQ[4:0] contains the type of transaction requested (e.g., memory code read, memory data read, memory write). During the "B" request part of the cycle, the request bus REQ[4:0], in the case of read and write transactions, provides the transaction length and A[35:3] provides the attribute of the transfer (e.g., uncacheable, write-combined, write-through, etc.), byte enables, and other data pertaining to the transaction.

The address signal group configuration used by the conventional microprocessor interface system 100 described above is problematic in certain application areas where package size and/or power is constrained. More particularly, the address signal group A[35:3], ADSTB[1:0], REQ[4:0] of the microprocessor interface system 100 includes 40 signals which must be provided on pins of a package for the microprocessor die. Furthermore, every time one of these signals is driven to the bus, additional power is consumed.

The present invention provides for a new type address signal group, called a quad-pumped address bus, that uses roughly half (e.g., 22) of the address signal group signals described above with reference to a double-pumped address bus, and which requires roughly half of the power of a double-pumped address bus. In one embodiment, the microprocessor and one or more bus agents may be implemented with a reduced number of pins to reduce package size and to reduce power consumption during quad-pumped address request transactions. In another embodiment, the microprocessor and one or more bus agents may each be implemented with the conventional number of pins in which a subset of the address and request pins are used to reduce power during quad-pumped address request transactions. For the embodiments in which both double-pumped and quad-pumped address buses are supported, mode switching may be performed during operation or negotiated by the devices coupled to the system bus 505 (e.g., the microprocessor 501 and one or more bus agents 503) during initialization (e.g., power-on or reset). Mode switching during operation may employ an additional signal on the system bus to switch between modes. Alternatively, an existing signal on the system bus may be employed for mode switching purposes.

FIG. 3 is a timing diagram illustrating a request phase of a quad-pumped transaction according to an embodiment of the present invention. A quad-pumped address bus according to an embodiment of the present invention employs a reduced-size address signal group including an address bus AHI[2:0] and ALO[16:3], a request bus RQ[2:0], and two address strobe signals ADSTBP, ADSTBN. Alternatively, the address and request signals of the reduced-size address signal group may be collectively shown as an address and request bus ADR[19:0]. As shown by the timing diagram of FIG. 3, the request phase of the transaction is divided into two phases A and B for driving four request packets A, B, C, D out to the AHI, ALO and RQ buses during a single cycle of BCLK[1:0]. The first half of the BCLK[1:0] signals is labeled "A" during which time the A and B request packets are driven, and the second half is labeled "B" during which time the C and D request packets are driven. The ADSTBP and ADSTBN signals are each pulsed twice during the cycle. The two falling edges of ADSTBP are used to latch request packets A and C, respectively, and the two falling edges of ADSTBN are used to latch request packets B and D, respectively, provided over the AHI, ALO and RQ buses. Since four packets are provided over the address signal group in a single cycle of BCLK[1:0], the address signal group is called a quad-pumped address bus.

FIG. 4 is a diagram of a table 400 illustrating mapping of the data of each of the request packets A-D onto the quad-pumped address bus during request phases A and B of a double-pumped request transaction according to an exemplary embodiment of the present invention for an x86-compatible microprocessor. Table 400 lists the phase designators (A and B), the packet designators (A-D), and the corresponding data asserted on the AHI[2:0], ALO[16:3] and RQ[2:0] signals for each quad-pumped request transaction. Alternatively, the AHI, ALO and RQ bus signals are listed as a single address and request bus ADR[19:0]. One skilled in the art will appreciate that the illustrated mapping is exemplary only and that many other mapping configurations are possible and contemplated by the present invention. The data of the address bus A (i.e., signals A[35:3]) are mapped as address signals "AA" during request phase A and as "AB" during request phase B. Likewise, the request data (REQ[4:0]) is mapped as request data "REQA" during request phase A and as "REQB" during request phase B.

During phase A of the double-pumped request transaction, the AHI, ALO and RQ buses (or the ADR bus) collectively carry the data of address signals AA[33:32, 30, 16:3] and the data of request signals REQA[2:0] for the request packet A, and the AHI, ALO and RQ buses (or the ADR bus) collectively carry the data of address signals AA[35:34, 31], a parity signal APA (not shown), the data of address signals AA[29:17], and the data of request signals REQA[4:3] for the request packet B. It is noted that the RQ[2] signal is undefined or otherwise asserted to a default level for packet B as denoted in table 400 with a dash "-". During phase B, the AHI, ALO and RQ buses (or the ADR bus) collectively carry the data of the address signals AB[33:32, 16:3] and the request signals REQB[2:0] for the request packet C, and the AHI, ALO and RQ buses (or the ADR bus) collectively carry the data of the address signals AB[35:34, 31], a parity signal APB, the data of address signals AB[29:17], and the data of request signals REQB[4:3] for the request packet D. Again, the RQ[2] signal is undefined or otherwise asserted to a default level for packet D. In other words, the ALO bus carries the data of the lowest 14 address bits during packets A and C (i.e., AA[16:3] and AB[16:3]) and carries the data of the next lowest 13 address bits and a parity bit during packets B and D (i.e., AA[29:17] & APA and AB[29:17] & APB), the AHI bus carries the data of three upper bits during packets A and C (e.g., AA[33:32, 30] and AB[33:32, 30]) and carries the data of the remaining three upper bits during packets B and D (e.g., AA[35:34, 31] and AB[35:34, 31]), and the RQ bus carries the data of the lower three request bits during packets A and C (i.e., REQA

[2:0] and REQB[2:0]) and carries the data of the remaining upper two request bits during packets B and D (i.e., REQA [4:3] and REQB[4:3]).

For the microprocessor interface system 100 employing the double-pumped address mode, the address signals A[35: 3] contain the 33-bit address of the transaction and the request signals REQ[4:0] contain the type of transaction requested in packet A, and the address signals A[35:3] provide the attribute of the transaction and the request signals REQ[4:0] provide the transaction length in packet B. In contrast, for a quad-pumped mode according to an embodiment of the present invention, the 33-bit address may be provided by the address signals AHI[2:0] and ALO[16:3] and the 5-bit transaction type is provided by the request signals RQ[2:0] in packets A and B of phase A, and the attribute of the transaction is provided by the address signals AHI[2:0] and ALO[16:3] and the transaction length is provided by the request signals RQ[2:0] in packets C and D of phase B. It is noted that additional bits may be defined as necessary or desired. For example, if a 37-bit address is used (e.g., A[39:3]), then two additional bits may be added to the AHI bus (e.g., AHI[4:0]) to transfer the same address.

Figure 5:
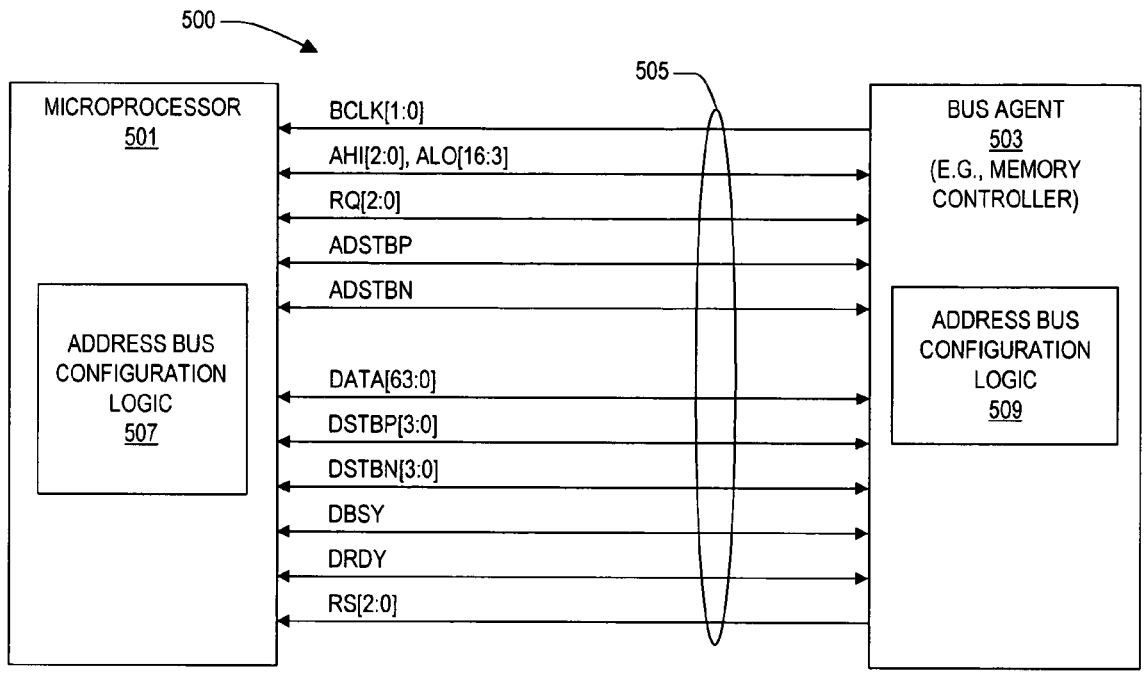
FIG. 5 is a simplified block diagram of a microprocessor interface system including a system bus with a quad-pumped address signal group according to an embodiment of the present invention.

FIG. 5 is a simplified block diagram of a microprocessor interface system 500 including a system bus 505 with a quad-pumped address signal group according to an embodiment of the present invention. The microprocessor interface system 500 includes a microprocessor 501 and a bus agent 503 interfaced with a system bus 505, in which the bus agent 503 represents any number of different types of bus agents as previously described for the bus agent 103. The DATA, DSTBP, DSTBN and RS buses along with the DBSY, DRDY and BCLK[1:0] signals are included and operate in substantially the same manner as that described for the conventional microprocessor interface system 100. In addition, the microprocessor 501 includes address bus configuration logic 507 and the bus agent 503 includes address bus configuration logic 509. The address bus configuration logic 507 and 509 each interface the AHI, ALO and RQ buses (or the ADR bus) and the address strobe signals ADSTBP and ADSTBN to enable quad-pumped request address transactions as described with reference to FIGS. 3 and 4. In particular, memory addresses and transaction request parameters for the transactions are provided over the bidirectional AHI, ALO and RQ buses (or ADR bus). In addition, the signals of the AHI, ALO and RQ buses (or ADR bus) provide the type of transaction requested conventionally over a request bus like that of the conventional microprocessor interface system 100 and as mapped to different ones of the quad-pumped request packets A, B, C, D as described above with reference to FIG. 4. Address strobes ADSTBP and ADSTBN are employed to latch associated request packet data during a single cycle of BCLK[1:0] as shown in FIG. 3.

Figure 6:
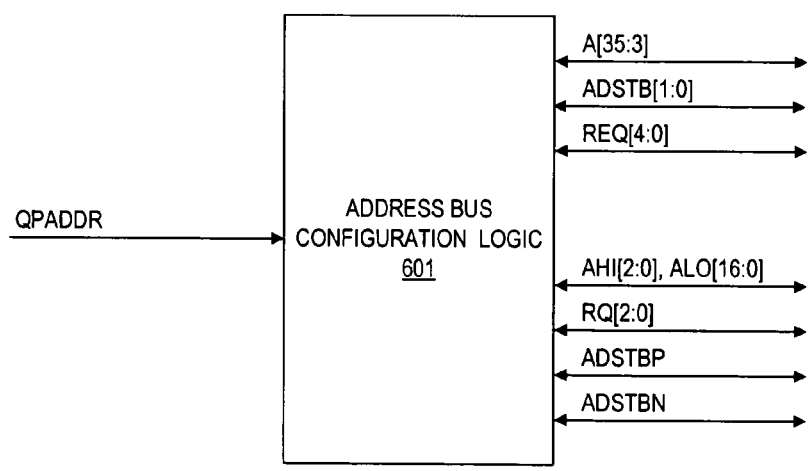
FIG. 6 is a block diagram of address bus configuration logic which may be used to implement the address bus configuration logic of FIG. 5 according to an exemplary embodiment of the present invention.

FIG. 6 is a block diagram of address bus configuration logic 601 which may be used to implement the address bus configuration logic 507 and/or the address bus configuration logic 509 according to an exemplary embodiment of the present invention. The address bus configuration logic 601 includes at least one input to which a quad-pumped address configuration enable signal QPADDR is provided. The address bus configuration logic 601 also provides inputs/outputs to which a double-pumped address signal group A[35:3], ADSTB[1:0], REQ[4:0] is coupled and to which a quad-pumped signal group AHI[2:0], ALO[16:3], RQ[2:0], ADSTBP, ADSTBN is coupled. In operation, if QPADDR is asserted, then a transaction request phase operates over the quad-pumped address signal group as described with reference to FIGS. 3-5. If QPADDR is not asserted, then a transaction request phase operates over the double-pumped address signal group as described with reference to FIGS. 1-2.

In one embodiment, the microprocessor 501 (and/or the bus agent 503) is configured with a reduced pin count in which the address bus configuration logic 507 (and/or 509) multiplexes the address and request signals onto the AHI, ALO and RQ buses (or the ADR bus). Alternatively, the microprocessor 501 (and/or the bus agent 503) is configured with a full set of pins so that the address bus configuration logic 507 (and/or 509) is configured according to the address bus configuration logic 601, which enables switching between the conventional double-pumped address mode and a quad-pumped address mode according to an embodiment of the present invention. The devices coupled to the system bus 505 may be configured to always operate according to the quad-pumped address mode (e.g., hardwired, blown fuses, etc.) or may be configured to negotiate for the operating mode, such as during initialization (e.g., power-on or reset). For example, in one embodiment the microprocessor 501 asserts one or more system bus signals (e.g., address signals) and the bus agent 503 asserts one or more other system bus signals during bus strapping to request the quad-pumped address mode. The quad-pumped address mode may be selected if all devices on the system bus 505 support and negotiate for the quad-pumped address mode during bus strapping.

One skilled will appreciate that signals may be shared with other signals and may be mapped differently than described herein. In one embodiment, the address bus configuration logic 507, 509 and 601 includes logic, circuits, and/or microcode. In another embodiment, the address bus configuration logic includes a fuse that is blown during fabrication to establish a specific address bus configuration. Other embodiments contemplate read-only memory, write-once memory, and the like.

FIG. 7 is a diagram of a table 700 illustrating a signal congruency mapping between the double-pumped address mode and the quad-pumped address mode according to one embodiment of the present invention for a system device (microprocessor or bus agent) that supports both address modes. As shown, the REQ[2:0] signals of the double-pumped mode map to the RQ[2:0] signals (or the ADR[2:0] signals) of the quad-pumped mode. The REQ[4:3] of the double-pumped mode are not mapped since not used in the quad-pumped mode. The A[16:3] signals of the double-pumped mode map to the ALO[16:3] signals (or the ADR[16:3] signals) of the quad-pumped mode. The A[30] signal of the double-pumped mode maps to the AHI[0] signal (or the ADR [17] signal) of the quad-pumped mode. The A[18:17] signals of the double-pumped mode map to the AHI[2:1] signals (or the ADR[18:17] signals) of the quad-pumped mode. The A[34:31, 29:19] signals of the double-pumped mode are not mapped since not used in the quad-pumped mode. The ADSTB[0] strobe signal maps to the ADSTBP strobe signal whereas the ADSTB[1] signal is not mapped. Instead, the A[35] signal of the double-pumped mode is shown mapped to the ADSTBN signal of the quad-pumped mode.

One skilled will appreciate that the signals may be mapped differently than that shown and described herein. For example, although it is possible to map the ADSTB[1] signal to the ADSTBN, it is simpler, as understood by those skilled in the art, to map the ADSTBN signal to any one of the unused A[35:31] or A[29:19] address signals. In various embodiments, the ADR[19:0], ADSTBN and ADSTBP signals may be mapped to any combination of the REQ[4:0], A[35:3] and ADSTB[1:0] signals.

Although the present invention has been described in considerable detail with reference to certain preferred versions thereof, other versions and variations are possible and contemplated. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor, comprising:
   a system clock pin receiving a bus clock signal;
   a first plurality of address pins and a first plurality of request pins;
   a second plurality of address pins and a second plurality of request pins; and
   address bus configuration logic, comprising an enable input which receives an enable signal, for operating said first plurality of address pins and said first plurality of request pins to perform a first transaction when said enable signal is asserted, and for operating said first and second plurality of address pins and said first and second plurality of request pins to perform a second transaction when said enable signal is not asserted, wherein said address bus configuration logic asserts a plurality of request packets onto said first plurality of address pins for each of a plurality of phases of a cycle of said bus clock signal;
   wherein, when said enable signal is asserted, said address bus configuration logic multiplexes first and second address data and first and second request data onto said first plurality of address pins and said first plurality of request pins during a first phase of said cycle of said bus clock signal and multiplexes third and fourth address data and third and fourth request data onto said first plurality of address pins and said first plurality of request pins during a second phase of said cycle of said bus clock signal.

2. The microprocessor of claim 1, wherein said first plurality of address pins comprises a first address strobe signal that is used to latch said first and third address and request data and a second address strobe signal that is used to latch said second and fourth address and request data.

3. The microprocessor of claim 1, wherein said first and second address data collectively comprise an address of a transaction, wherein said first and second request data collectively comprise a type of said transaction, wherein said third and fourth address data collectively comprise an attribute of said transaction, and wherein said third and fourth request data collectively comprise a length of said transaction.

4. The microprocessor of claim 1, wherein said first transaction comprises asserting a first plurality of request packets onto said first plurality of address pins for each of a first plurality of phases of a cycle of said bus clock signal.

5. The microprocessor of claim 4, wherein said second transaction comprises asserting a second plurality of request packets onto said first and second plurality of address pins for each of a second plurality of phases of a cycle of said bus clock signal.

6. A microprocessor interface system, comprising:
   a system bus comprising a bus clock, a first plurality of address signals, a first plurality of request signals, a second plurality of address signals, and a second plurality of request signals; and
   a plurality of devices coupled to said system bus;
   wherein one or more of said plurality of devices is configured to perform a quad-pumped transaction on said system bus in which a plurality of request packets are sequentially transferred during each of a plurality of phases of one cycle of said bus clock, wherein each of said one or more of said plurality of devices comprises:

address bus configuration logic, comprising an enable input which receives an enable signal, for operating said first plurality of address signals and said first plurality of request signals to perform a first transaction when said enable signal is asserted, and for operating said first and second plurality of address signals and said first and second plurality of request signals to perform a second transaction when said enable signal is not asserted, wherein said address bus configuration logic asserts a plurality of request packets onto said first plurality of address signals for each of a plurality of phases of a cycle of said bus clock signal;

wherein said quad-pumped transaction comprises first address and request data multiplexed as first and second request packets during a first phase of said one cycle of said bus clock and second address and request data multiplexed as third and fourth request packets during a second phase of said one cycle of said bus clock.

7. The microprocessor interface system of claim 6, wherein each of said plurality of devices comprises a selected one of a microprocessor and a bus agent.

8. The microprocessor interface system of claim 6, wherein said quad-pumped transaction comprises first and second request packets during a first phase and third and fourth request packets during a second phase of said one cycle of said bus clock.

9. The microprocessor interface system of claim 8, wherein said first and second request packets collectively comprise a transaction address and a transaction type, and wherein said third and fourth request packets collectively comprise a transaction attribute and a transaction length.

10. The microprocessor interface system of claim 6, wherein said quad-pumped transaction comprises first address and request data multiplexed as first and second request packets during a first phase of said one cycle of said bus clock and second address and request data multiplexed as third and fourth request packets during a second phase of said one cycle of said bus clock.

11. The microprocessor interface system of claim 6, wherein said plurality of devices negotiate operation of said system bus between a double-pumped address mode for performing a double-pumped transaction and a quad-pumped address mode for performing said quad-pumped transaction.

12. A method of performing a transaction on a system bus, comprising:

negotiating, by a plurality of devices coupled to the system bus, between operating the system bus in a double-pumped address mode or a quad-pumped address mode; and directing address bus configuration logic within one or more of the plurality of devices to operate in the quad-pumped address mode, and performing the transaction, comprising:

asserting a first request packet on the system bus during a first portion of a first phase of a cycle of a system bus clock;

asserting a second request packet on the system bus during a second portion of the first phase of the cycle of the system bus clock;

asserting a third request packet on the system bus during a first portion of a second phase of the cycle of the system bus clock; and asserting a fourth request packet on the system bus during a second portion of the second phase of the cycle of the system bus clock;

wherein said asserting a first request packet and said asserting a second request packet comprise multiplexing first address data onto the system bus and wherein said asserting a third request packet and said asserting a fourth request packet comprise multiplexing second address data onto the system bus.

13. The method of claim 12, further comprising:

asserting a first address strobe to latch the first and third request packets; and asserting a second address strobe to latch the second and fourth request packets.

14. The method of claim 12, wherein said asserting a first request packet and said asserting a second request packet collectively comprise asserting first address data and first request data during the first phase of the cycle of the system bus clock, and wherein said asserting a third request packet and said asserting a fourth request packet collectively comprise asserting second address data and second request data during the second phase of the cycle of the system bus clock.

15. The method of claim 14, wherein said asserting first address data comprises asserting an address of a transaction, wherein said asserting first request data comprises asserting a type of the transaction, wherein said asserting second address data comprises asserting an attribute of the transaction, and wherein said asserting second request data comprises asserting a length of the transaction.

* * * * *